United States Patent [19]
Rahon et al.

[11] Patent Number: 6,038,389
[45] Date of Patent: Mar. 14, 2000

[54] METHOD OF MODELING A PHYSICAL PROCESS IN A MATERIAL ENVIRONMENT

[75] Inventors: Daniel Rahon, Pau; Mohamed Masmoudi, Toulouse, both of France

[73] Assignee: Institut Francais Du Petrole, Rueil-Malmaison, France

[21] Appl. No.: 09/022,837

[22] Filed: Feb. 12, 1998

[51] Int. Cl.[7] .............................. G06G 7/48; G06G 17/13
[52] U.S. Cl. ................................ 395/500.31; 395/500.23
[58] Field of Search .......................................... 395/500.31

[56] References Cited

U.S. PATENT DOCUMENTS 5,450,568   9/1995   Saji et al. .

OTHER PUBLICATIONS

Printout from website http://dutita0.twi.tudelft.nl/isnas/report95-37/inaccnas.html; Domain decomposition for the incompressible Navier–Stokes equations: solving subdomain problems accurately and inaccurately; hand numbered pp. 1–8, 1995.

Krylov Subspace Methods: Theory, Algorithms, and Applications; Youcef Saad; pp. 24–41.

Pratical Aspects of Krylov subspace Iterative Methods In CFD; Thomas H. Pulliam; Stuart Rogers and Timothy Barth; Sep. 1995; pp. 21–1 to 21–11.

*Primary Examiner*—Kevin J. Teska
*Assistant Examiner*—Hugh Jones
*Attorney, Agent, or Firm*—Antonelli, Terry, Stout & Kraus, LLP

[57] ABSTRACT

A method modeling a physical process in a material environment. A system of modeling equations at the level of each of the grid cells of a grid pattern involves a number n of cells subdividing the environment. The model is achieved at a relatively low cost and within a reasonable calculating time in relation to the quality and the accuracy of the simulations obtained, mainly by reducing the size of the solution problem. To that effect, a Krylov space of dimension d, much smaller than the number n of grid cells, is used. This has the effect of reducing the volume of the solution operations. The method can be used for modeling of fluid flow in an underground reservoir of, for example, hydrocarbons.

2 Claims, 3 Drawing Sheets

METHOD OF MODELING A PHYSICAL PROCESS IN A MATERIAL ENVIRONMENT

FIELD OF THE INVENTION

The present invention is a method of simplifying the making of a model allowing simulation of a physical process in a material environment, notably fluid flow in an underground reservoir.

The method applies, for example, to the modeling of hydrocarbon flows in reservoirs.

BACKGROUND OF THE INVENTION

Characterization of a petroleum reservoir is a delicate problem faced by geophysicists, geologists and reservoir engineers. When one tries to clarify or to validate the description of a geologic model, interpretation of well tests, of interference tests and of production results plays a very important part.

Some of these interpretation techniques are based on inversion procedures where one tries to adjust numerical simulations to field measurements, from a gridded geologic model by varying the parameters of this model.

The use of numerical simulation has thus become more and more important, and as the geologic description has become increasingly finer, the size of the simulated models has increased, and calculating times, which increase correlatively, have remained very high despite computer performance improvements.

Similarly, during an inversion procedure using simulations on gridded models, it is essential to obtain very accurate solutions which introduce no numerical biases when they are compared with field measurements.

In order to model flows in a petroleum reservoir, it is conventional to use the generalized Darcy equations, the law of mass conservation, and to associate therewith well conditions, boundary conditions and initial conditions.

A system of non-linear partial differential equations is thus obtained, whose unknowns are the pressures P and the saturations S of each phase, and possibly the concentrations of each constituent in the phases.

$$\frac{\partial}{\partial t}\left(\phi \sum_p C_{ip}\rho_p S_p\right) - \text{div}\left(\sum_p C_{ip}\rho_p V_p\right) - \delta_{qi} = 0 \quad (1)$$

where $\phi$ is the porosity, $C_{ip}$ the concentration of constituent i, $S_p$ the saturation of phase p, $\rho_p$ the density and $\delta_{qi}$ the flow rate of constituent injected into or produced from the wells.

The velocity of the fluid and the pressure are related by Darcy's law:

$$V_p = \frac{Kkr_p}{\mu_p}\text{grad}(P_p + \rho_p gz) \quad (2)$$

where K is the absolute permeability, $kr_p$ the relative permeability of phase p; and $\mu_p$ the relative viscosity of phase p.

The saturation and the constituent balances, as well as the capillarity relations, are to be added to these equations.

In case of a barely compressible single-phase fluid, the system of equations reduces to:

$$CV\phi\frac{\partial P}{\partial t} - V\text{div}\left(\frac{K}{\mu}\text{grad}(P) + \rho gz\right) = q_p \quad (3)$$

with zero flow conditions or pressure conditions imposed at the edges and initial conditions. C represents the total compressibility (pores and fluid), supposedly constant in the model, and V $\phi$ the pore volume.

After discretization of the underground environment studied by means of a grid pattern, using a finite-volume solution method, the system of equations to be solved for each grid of the gridded model is:

$$CV_i\phi_i\frac{\partial P_i(t)}{\partial t} - \frac{1}{\mu}\sum_{v(i)} T_{iv(i)}[(P_{v(i)}(t) - P(t)_i) + \rho g(z_{v(i)} - z_i)] = q_p\delta_{ip} \quad (4)$$

with:

i: grid cell index v(i): all the grid cells adjoining grid cell i $\delta_{ip} = 1$: if well p is in grid cell i $T_{iv(i)}$: transmissivity between grid cells i and v(i)

If the system is written in matrical form by denoting the transmissivity matrix by A, the diagonal matrix of CV $\phi$ by D and the second member by Q, we obtain:

$$\begin{cases} D\frac{\partial P(t)}{\partial t} = AP(t) + Q, t \in [0, \infty[ \\ P(t=0) = P_0 \end{cases} \quad (5)$$

where P is a vector of dimension n the number of unknowns which are the bottomhole pressures and in each grid cell of the gridded model, and $P_0$ represents the initial state of the reservoir. Matrix A is a positive symmetrical square matrix nxn.

Diagonal matrix D being positive and independent of time, the matrical system can be written as follows:

$$\begin{cases} U = D^{1/2}P \\ \frac{\partial U(t)}{\partial t} = D^{-1/2}AD^{-1/2}U(t) + D^{-1/2}Q, t \in [0, \infty[ \\ U(t=0) = U_0 = D^{1/2}P_0 \end{cases} \quad (6)$$

Solution for all the grid cells of the system of equations turns out to be very heavy and costly in calculating time if the number of grid cells of the model is very high, which is generally the case.

SUMMARY OF THE INVENTION

The method according to the present invention allows simplifying of the making of a model allowing simulation of fluid flow in a heterogeneous material environment (such as hydrocarbon flows in reservoirs, for example), which are divided by means of a grid pattern into a great number n of elementary cells or grid cells, this model being formed by solving a system of fluid flow modeling equations from known initial values of a certain number of physical parameters such as pressures, saturations of various phases, flow rates, porosities, etc, these initial values being obtained by various well-known means: core drilling, logs, interpretations, etc.

This model is achieved at a relatively low cost and within a reasonable calculating time in relation to the quality and the accuracy of the simulations obtained, mainly by reducing the size of the solution problem, by using a Krylov space of dimension d much smaller than the number n of grid cells.

The method according to the invention is applied in particular to form a model simulating single-phase fluid flows.

BRIEF DESCRIPTION OF THE DRAWINGS

Other features and advantages of the method according to the invention will be clear from reading the description hereafter of embodiments given by way of non limitative examples, with reference to the accompanying drawings, wherein.

DETAILED DESCRIPTION

I. Description of the Method

Figure 1:
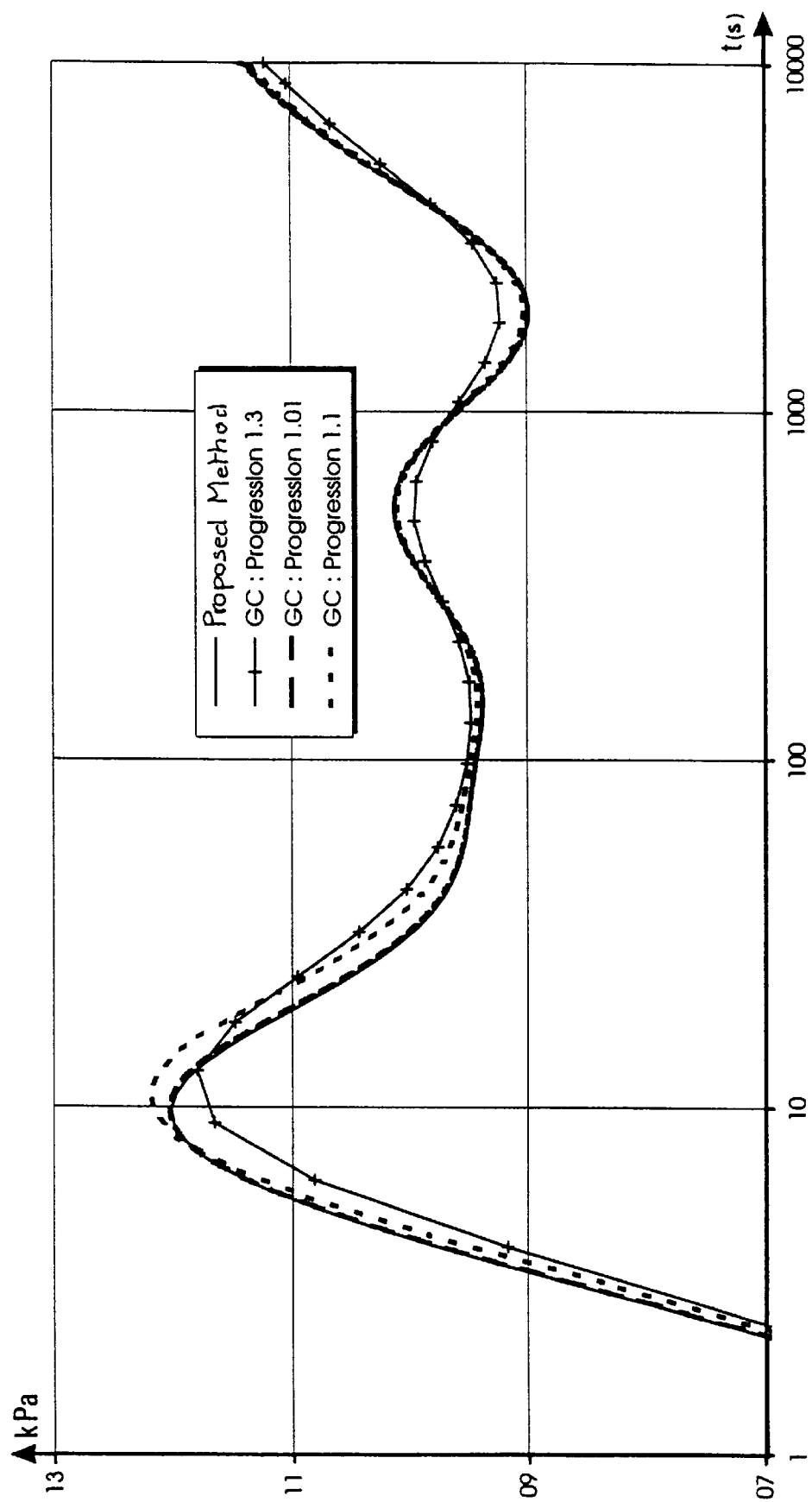
FIG. 1 shows the compared evolutions of the pressure derivative with respect to time on a logarithmic scale at the level of a production well drilled through a hydrocarbon reservoir, obtained by means of the method according to the invention and of a conventional simulation method in the case of a single-layer homogeneous reservoir of variable thickness.

The objective of the method is to obtain much more rapidly a model allowing simulation of single-phase and multiphase flows in an underground environment, by reducing the size of a complex modeling problem of considerable dimension n (n is of the order of $10^6$) to a system of differential equations of small dimension d (d is of the order of 10, for example). The method also allows determination of the pressure gradients in relation to parameters of the environment.

As will be shown in the description hereafter, the model is obtained by extracting from a space of dimension n a pertinent subspace of dimension d. This subspace is a Krylov space whose construction is based on the calculation of derivatives of higher order in time, or on another technique (proper subspaces, base vectors calculated with an integration pattern of the problem of size n, etc).

The method applies to derivation with respect to time and to derivation with respect to parameters of the environment. Derivation with respect to time allows solving of the direct problem, and derivation with respect parameters allows to dealing with the opposite problem.

The problem to be solved is the solution of a system of the following form:

$$D \cdot \frac{\partial U(t)}{\partial t} = A \cdot U(t) + Q$$
$$U(0) = U_0$$

and of the boundary conditions where $(U_i)_{i=1,n}$ is a vector obtained by division of the space studied into a grid pattern of n elements, D is a diagonal matrix, A is a symmetrical matrix and Q is a vector of dimension n.

The simplification provided by the method is based on the use of the space known as Krylov space, described in the literature, notably by Sonneveld P., CSG: A Fast Lanczos-type Solver for Non-symmetric Linear Systems, SIAM J. Sci. Comp., Vol.10, No 1, 36–52, 1989;

Saad Y. et al., GMRES: A generalized Minimal Residual Algorithm for Solving Nonsymmetric Linear Systems, SIAM J. Sci. Stat. Comp., Vol.7, No3, 856–869, 1986, or Golub G.H. et al.: Matrix Computations, The John Hopkins University Press, Baltimore, Second Edition. 1989.

It may be remembered that a Krylov space is a vector s ace of dimension d consisting of the sequence of vectors $E_d = (y_0, \ldots, y_d)$ with $$(y_i = U^{(i)}(0))_{i=0}^{d},$$

$d \leq n$, which can be readily calculated by recursion:

$$\begin{cases} y_0 = U_0 \\ y_1 = U^{(1)}(0) = D^{-1/2} A D^{-1/2} U_0 + D^{-1/2} Q \\ y_i = U^{(i)}(0) = D^{-1/2} A D^{-1/2} U^{(i-1)}(0), d > i > 1 \end{cases}$$

Matrix A being sparse, these matrix-vector products have a linear complexity as a function of n.

The simplification provided by the method comprises the projection of the system of equations in a Krylov space of dimension d+1, with d much smaller than n, generated by the sequence of vectors:

$$\langle U^{(0)}, U^{(1)}, \ldots, U^{(d)} \rangle$$

where $$U^{(i)} = A U^{(i-1)} \text{ and } U^{(0)} = U(0)$$

An approximate solution $U_a(t)$ is then sought in this Krylov space in the following form:

$$U_a(t) = \sum_{j=0}^{d} v_j(t) U^{(j)}$$

The problem now consists in calculating the $(v_j(t))_{j \times 0,d}$, which is a reduced dimension problem.

It is well-known that the conjugate gradient method gives, at the d-th iteration, the solution which minimizes the residue of the system to be solved in a Krylov space of dimension d. Hence the convergence in n iterations at most.

Only independent Krylov vectors are used by considering the highest index d<n such that $$(y_i)_{i=0}^{d}.$$

It can be readily seen that the solution U(t) belongs to space Ed, and therefore that we can work in this space.

In practice, we will use a particular Krylov space because of the presence of the source term Q that we want to eliminate.

To that effect, the system of equations (6) is written in the following form:

$$\begin{cases} Z(t) = \dfrac{\partial U(t)}{\partial t} \\ \tilde{A} = D^{-1/2} A D^{-1/2} \\ \dfrac{\partial Z(t)}{\partial t} = \tilde{A} Z(t), t \in [0, \infty[ \\ Z(0) = \dfrac{\partial U(0)}{\partial t} = \tilde{A} U_0 + D^{-1/2} Q \end{cases} \quad (7)$$

and the approximate solution thereto is sought in the Krylov space $$z_a(t) = \sum_{j=1}^{d} v_j(t) y_j \quad (8)$$

The Galerkin method is for example used therefore, which is notably described in:

Lascaux P. and Théodor R.: Analyse numérique matricielle appliquée á l'art de l'ingénieur, Masson, Paris, 1987, Tome 2;
Strang G.: Introduction to Applied Mathematics, Wellesley—Cambridge Press, Wellesley, Mass., 1986.

The Galerkin method leads to:

$$\left\langle \dfrac{\partial z_a(t)}{\partial t}, y_i \right\rangle = \langle \tilde{A} z_a(t), y_i \rangle, 1 \le i \le d$$

and taking relation (8) into account, we obtain:

$$\sum_{j=1}^{d} \langle y_j, y_i \rangle \dfrac{\partial v_j(t)}{\partial t} = \sum_{j=1}^{d} \langle \tilde{A} y_j, y_i \rangle v_j(t), 1 \le i \le d$$

If we put $M = (\langle y_j, y_i \rangle)_{i,j=1,d}$ and $B = (\langle A y_j, y_i \rangle)_{i,j=1,d}$, the system is written as follows:

$$\begin{cases} m \dfrac{\partial v}{\partial t} = Bv, t \in [0, \infty[ \\ v(0) = (1, 0, \ldots, 0) \end{cases} \quad (9)$$

The initial condition ensues from relation (8) by writing that $z_a(0) = z(0)$ and by using the fact that the Krylov vectors are independent.

The system of equations (9) of dimension d can be readily solved and we obtain the expressions of $v_i$ as a function of time. An approximate solution to the to system of equations (6) is thereafter deduced therefrom by calculating:

$$u_a(t) = \sum_{j=1}^{d} \int_0^r v_j(s) ds y_i + y_0$$

II Solution of the Reduced Problem

When d is small, system (9) can be solved by means of a direct method. Consider a matrix S such that $M = S^{1/2} S^{1/2}$ (S is a square root of M) and put $w(t) = S^{1/2} v(t)$.

The system of equations (9) then becomes:

$$\begin{cases} \dfrac{\partial w(t)}{\partial t} = S^{-1/2} B S^{-1/2} w(t) \\ w(0) = S^{1/2} v(0) \end{cases}$$

and it can be solved by diagonalization of the symmetrical matrix $S^{-1/2} B S^{-1/2}$.

This "exact" integration method cannot be used in cases where the system of equations (5) has a second member which varies as a function of time, or in a non-linear case. A numerical pattern can generally be used to integrate the reduced problem.

III. Numerical Implementation

Remembering that $M = (\langle y_j, y_i \rangle)_{i,j=1,d}$, we have, by using the symmetry of the matrix of transmissivities A, $\langle y_j, y_i \rangle = \langle A^j y_0, A^i y_0 \rangle = \langle y_0, A^{i+j} y_0 \rangle$. This means that the terms of M are constant on the codiagonal i+j=constant. It is also shown that B is obtained by translation of the matrix M: $b_{i,j=mi+1,j}$.

These remarks are likely to accelerate calculations. But, in practice, the successive iterations of $A^j$ tend to highly increase in norm. A possible step consists in applying Schmidt's orthogonalization process to the vectors of the Krylov base. This technique has two advantages:

it avoids generation of elements of the base of very great norm.
it allows detection of the existence of dependent Krylov vectors, and thus determination of the optimum size d of the small system.

IV. Results

The method has been applied to some reference cases by comparing the solutions obtained to the solutions given by a conventional simulation consisting in dividing time into a discrete sequence of instants $t_k$ and in solving the large-size system at each instant.

1) EXAMPLE 1

Homogeneous Case

Consider the case of a hydrocarbon reservoir comprising a layer of homogeneous permeability and porosity, on which a grid pattern comprising 58×67 grid cells horizontally has been formed. The finest grid pattern is next to the well which is placed at the centre of the modeled reservoir. The permeability is 700 mD, and the porosity is 30%. The thickness of the modeled reservoir is variable and ranges between 40 m and 1 m, and the size of the grid cells ranges from 50 m far from the well to 5 m around the well. Pumping has been simulated during 86,400 seconds (1 day), with a flow rate of 30 m³/day.

FIG. 1 compares the values obtained by means of the method according to the invention to the values obtained by means of a conventional time division type method with solution of the linear systems by a conjugate gradient method. It can be seen that the valves are similar. The results obtained by means of the present method coincide with the conjugate gradient when the time division interval is short at the start of the simulation (0.1) and the geometric progression thereof is low (1.01). When the time intervals increase with a greater geometric proportionality, the results obtained by means of the derivative diverge. The initial and maximum time intervals, as well as the proportionality of the geometric progression of the various tests, are shown in the table below.

For the same simulation quality, the calculating times required for construction of the model by means of the method according to the invention are much shorter than those required for a conventional simulation by means of a conjugate gradient type method.

All the simulations shown have been performed on a workstation.

Table 1

Comparison of the calculating times of the homogeneous case of variable thickness

TABLE 1

Comparison of the calculating times of the homogeneous case of variable thickness

| Case | Time interval min | Time interval progression | Max. time interval | Calculating time (CPU seconds) |
|---|---|---|---|---|
| 1 | 1 | 1.3 | 10,000 | 20 |
| 2 | 1 | 1.1 | 1,000 | 68 |
| 3 | 0.1 | 1.01 | 1,000 | 268 |
| Proposed method | 25 element Krylov base | | | 85 |

2) EXAMPLE 2

Case of a Channel

Consider the case of a hydrocarbon reservoir consisting of a layer comprising two different permeabilities organized as a channel and of homogeneous porosity. The grid pattern comprises 91×91 grid cells horizontally, all identical of 10 m by 10 m. The well is placed at the centre of the modeled reservoir, and in the channel the permeability is 100 mD and the porosity 20%. The channel is parallel to the X-axis and of width 310 m centered on the well. The thickness of the modeled reservoir is constant and equals 10 m. The part outside the channel has a permeability of 1 mD and a porosity of 20%. Pumping has been simulated during 300,000 seconds (about 3.5 days) with a flow rate of 50 m$^3$/day.

Figure 2:
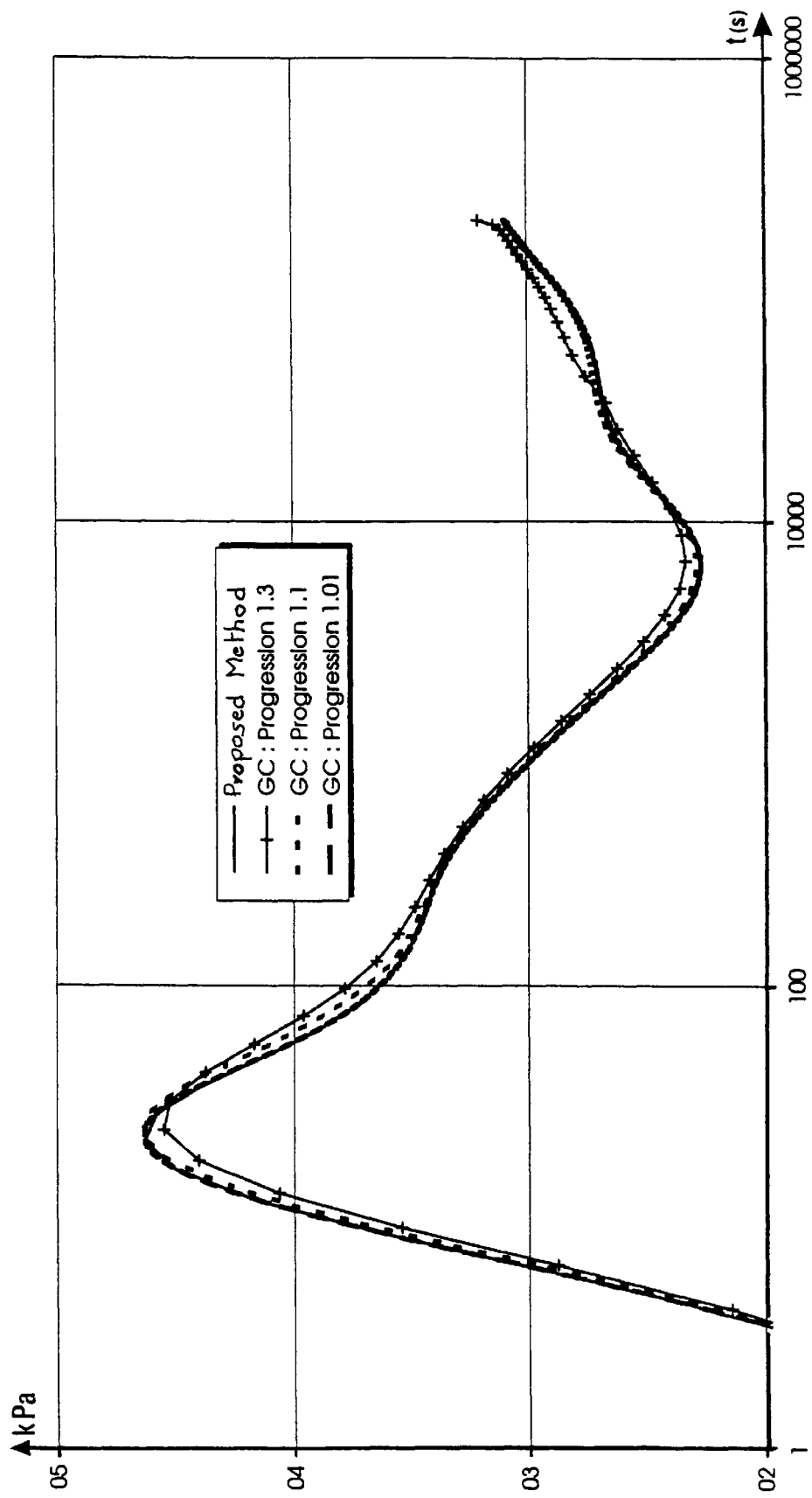
FIG. 2 shows the compared evolutions of the bottomhole pressure derivative with respect to time on a logarithmic scale, obtained by means of the method according to the invention and by means of a conventional simulation method, in the case of a single-layer heterogeneous reservoir arranged as a channel.

FIG. 2 compares the values obtained with the method according to the invention to the values obtained by means of a conventional time division method with solution of the linear systems by a conjugate gradient method. As in the previous case, it can be seen that the results are similar. However, the results obtained by means of the present method coincide with the conjugate gradient when the time division interval is short at the start of the simulation (0.1) and the geometric progression thereof is low (1.01). When the time intervals increase with a greater geometric proportionality the results obtained by means of the derivative diverge.

The initial and maximum time intervals, as well as the geometric progression proportionality of the various tests, are shown in the table below. It can be noted that, in all the configurations tested, the proposed method is faster than the conventional method and provides more accurate results.

| Case | Time interval min | Time interval progression | Max. time interval | Calculating time (CPU seconds) |
|---|---|---|---|---|
| 1 | 1 | 1.3 | 10,000 | 31 |
| 2 | 1 | 1.1 | 1,000 | 71 |
| 3 | 0.1 | 1.01 | 1,000 | 389 |
| Proposed method | 20 element base Krylov | | | |

3) EXAMPLE 3

Multilayer Heterogeneous Case

Consider the case of a hydrocarbon reservoir comprising three layers, each subdivided by means of a grid pattern of 55 grid cells in the two horizontal directions. The grid pattern is finer close to the well placed at the centre of the modeled reservoir.

The horizontal permeability of the three layers is, from the bottom up respectively: 10 mD, 200 mD and 1 mD.

The vertical permeabilities are respectively 1 mD, 5 mD, 0.1 mD and the porosity is homogeneous (20%). The thickness of each layer is five meters, and the horizontal size of the grid cells ranges from 100 meters far from the well to five meters around the well.

Figure 3:
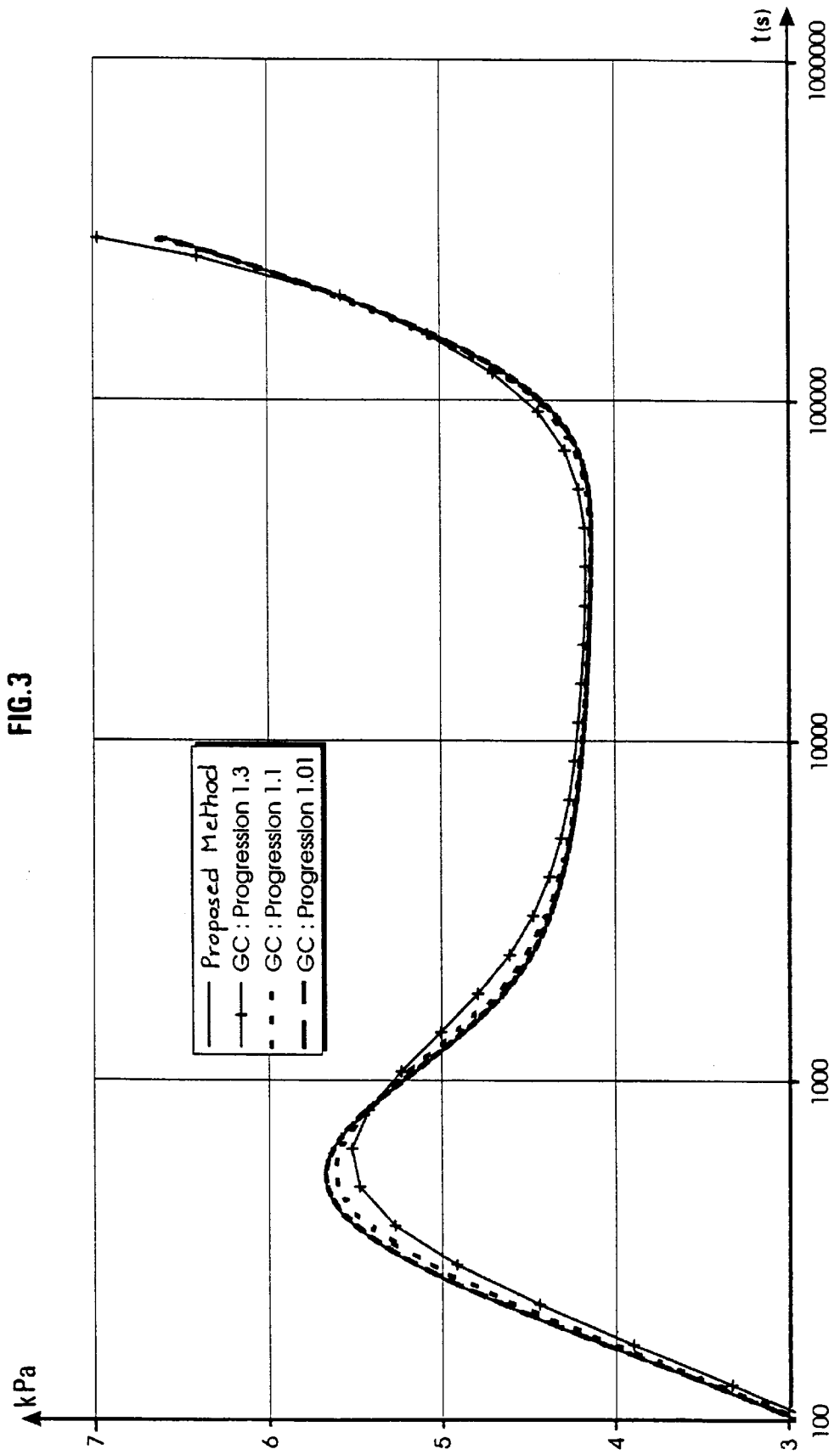
FIG. 3 shows the compared evolutions of the pressure derivative with respect to time on a logarithmic scale, obtained by means of the method according to the invention and by means of a conventional simulation method, in the case of a multi-layer heterogeneous reservoir.

Pumping has been simulated during 200,000 seconds with a flow rate of 50 m$^3$/day. FIG. 3 compares the values obtained by means of the method according to the invention to the values obtained by means of a conventional method. As in the previous examples, the values are similar. With reference to FIG. 3, it can be noted that the results obtained by means of the present method coincide with the conjugate gradient when the time division interval is short at the start (0.1) and slowly increases with a progression of 1.01. The solutions obtained differ more and more when the time division interval increases with an increasingly greater geometric proportionality. The characteristics of the tests presented and the respective calculating times are shown in the table below:

| Case | Time interval min | Time interval progression | Max. time interval | Calculating time (CPU seconds) |
|---|---|---|---|---|
| 1 | 1 | 1.3 | 10,000 | 74 |
| 2 | 1 | 1.1 | 1,000 | 347 |
| 3 | 0.1 | 1.01 | 1,000 | 890 |
| Proposed method | 25 element base Krylov | | | 185 |

The three examples shown above, selected from all those which were done to validate the proposed modeling- method with projection in a Krylov space, illustrate its advantages well. The large size evolution problem is reduced to the solution of a system of differential equations of small dimension, and the numerical results obtained are more accurate than those obtained with conventional simulation and are less costly.

Within the scope of a use of the numerical simulations in order to interpret well tests, using derivatives of higher order in time to construct the Krylov base is very advantageous because it allows direct simulation of the pressure derivative with respect to time. This derivative is available not only for the bottomhole pressure, but also for each grid cell modeling the reservoir, and unlike the discrete case it can be calculated continuously all the time.

Finally, it can be noted that the storage cost of the information required during calculation is identical to that of a conventional simulation with time division and solution of a linear system at each time interval.

What is claimed is:

1. A method of modeling hydrocarbon flow in a heterogeneous underground reservoir crossed by a production well, comprising the steps of:

(a) acquiring geological and geophysical data about the reservoir;

(b) forming a model of the reservoir using the geological and geophysical data;

(c) dividing the reservoir model with a grid pattern having a number n of grid cells;

(d) solving, in each of the n grid cell fluid flow modeling equations having known initial values of different physical parameters by using a Krylov space of dimension d, smaller than the number of n of grid cells, in order to reduce the volume of solution operations; and (e) determining the fluid pressure in the production well and the derivatives thereof with respect to time;

wherein the Krylov space is generated by using pressure derivatives of higher order with respect to time.

2. A method as claimed in claim 1, wherein the fluid flow modeling equations relate to single-phase fluids.

* * * * *